Figure 1:
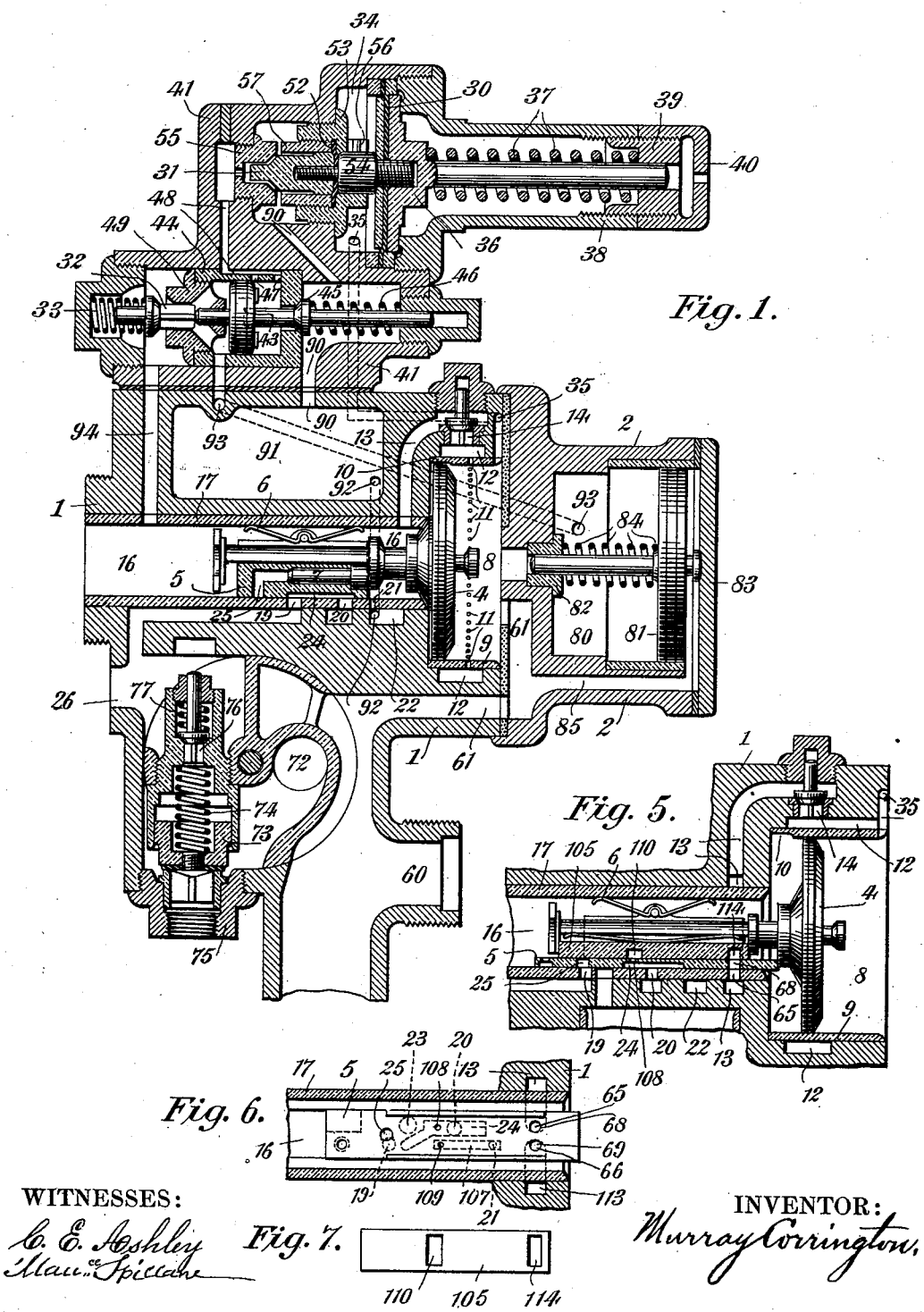

No. 749,262. PATENTED JAN. 12, 1904.
M. CORRINGTON.
AUTOMATIC FLUID PRESSURE BRAKE APPARATUS.
APPLICATION FILED JULY 1, 1902.
NO MODEL. 3 SHEETS—SHEET 1.

WITNESSES:
C. E. Ashley
Mau. Spillane

INVENTOR:
Murray Corrington

No. 749,262. PATENTED JAN. 12, 1904.
M. CORRINGTON.
AUTOMATIC FLUID PRESSURE BRAKE APPARATUS.
APPLICATION FILED JULY 1, 1902.
NO MODEL. 3 SHEETS—SHEET 2.
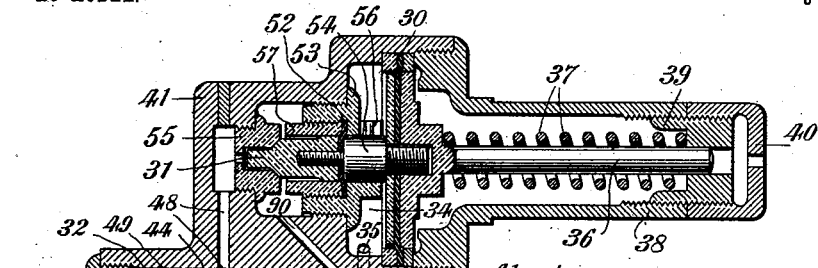
*Fig. 2.*
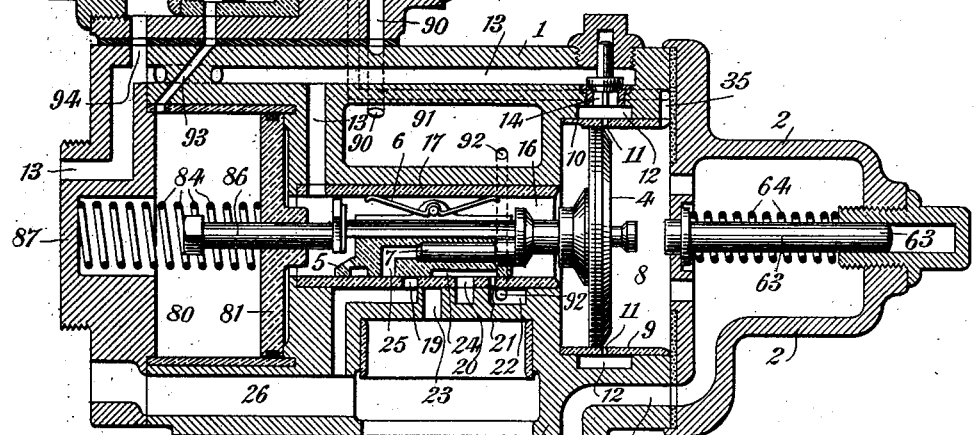
*Fig. 4.*
*Fig. 3.*
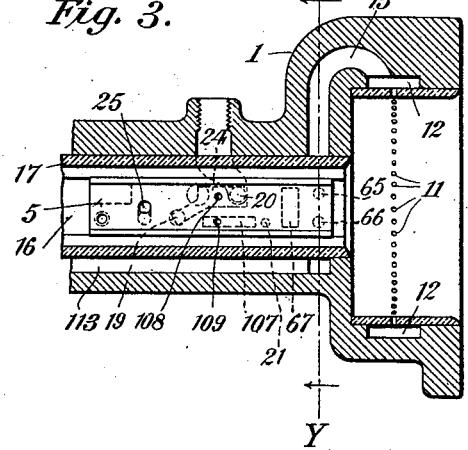
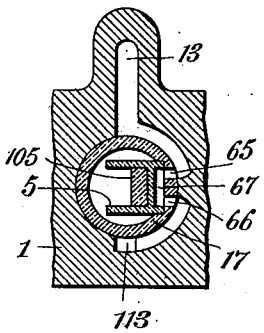
WITNESSES:
C. E. Ashley
Maurice Spillane
INVENTOR:
Murray Corrington No. 749,262. PATENTED JAN. 12, 1904.
M. CORRINGTON.
AUTOMATIC FLUID PRESSURE BRAKE APPARATUS.
APPLICATION FILED JULY 1, 1902.
NO MODEL. 3 SHEETS—SHEET 3.
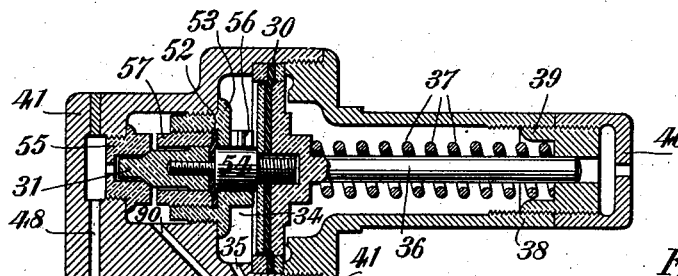
Fig. 8.
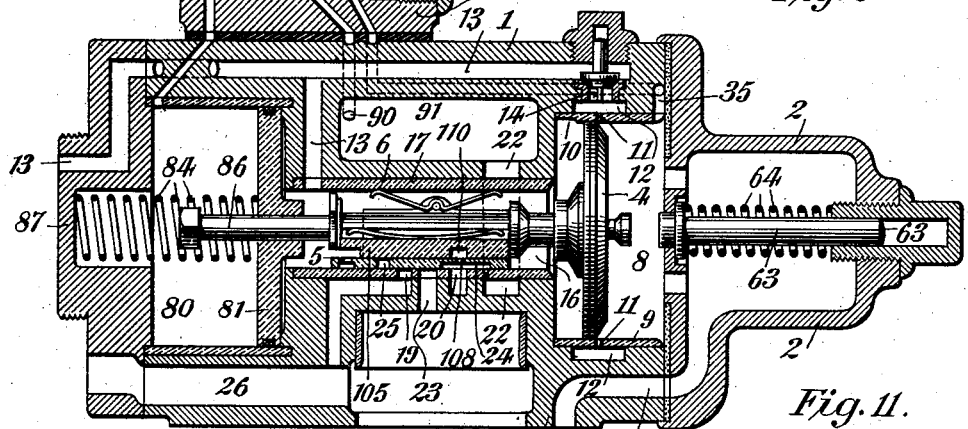
Fig. 11.
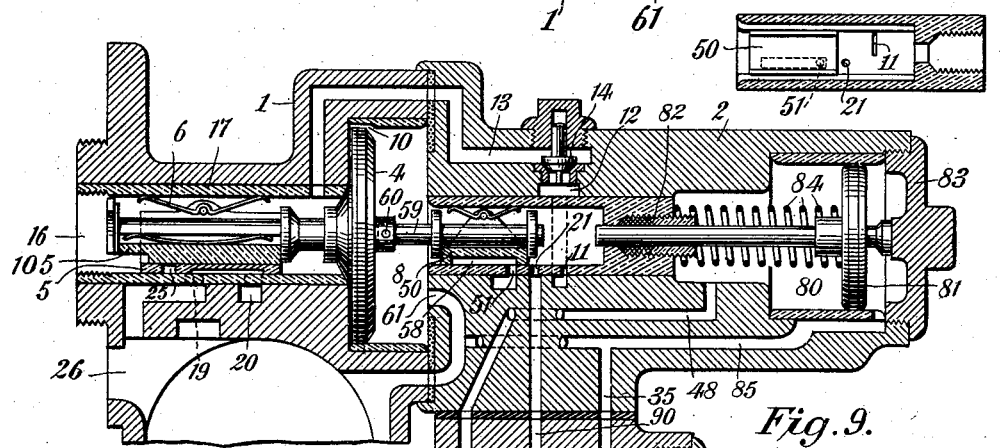
Fig. 9.
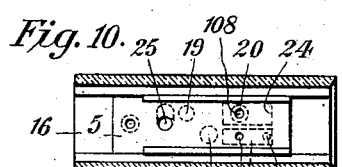
Fig. 10.
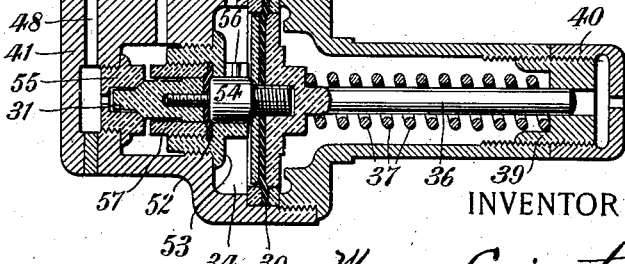
WITNESSES:
C. E. Ashley
Mau. Spillane
INVENTOR
Murray Corrington.

No. 749,262. Patented January 12, 1904.

UNITED STATES PATENT OFFICE.

MURRAY CORRINGTON, OF NEW YORK, N. Y.

AUTOMATIC FLUID-PRESSURE BRAKE APPARATUS.

SPECIFICATION forming part of Letters Patent No. 749,262, dated January 12, 1904.

Application filed July 1, 1902. Serial No. 113,887. (No model.)

*To all whom it may concern:*

Be it known that I, MURRAY CORRINGTON, a citizen of the United States, residing at New York city, in the county and State of New York, have invented certain new and useful Improvements in Automatic Fluid-Pressure Brake Apparatus, of which the following is a specification.

My invention relates to improvements in automatic fluid-pressure brake mechanism such as are now in general use more particularly on the cars of steam railroads, but such as may be used on any railway-vehicles.

The general nature of my improvements may be defined as mechanism for effecting the recharging of the auxiliary reservoirs upon the cars while the brakes are applied and afterward releasing the brakes with certainty when desired instead of releasing the brakes as a necessary preliminary to recharging the reservoirs.

My improvements herein illustrated and described are intended to enable the engineer to apply the brakes after first charging the train-pipe and auxiliary reservoir on each car to the normal pressure, then while the triple valve is in the brake-setting position to recharge the auxiliary reservoir, readmit pressure from the reservoir to the brake-cylinder as the pressure in the cylinder shall leak away, or as it may become necessary to apply the brakes with greater force, then again recharge the reservoir, again admit pressure to the cylinder, and repeat these operations as long as desired, keeping the brakes continuously set all the while, and finally to release the brakes with certainty when desired.

It will be understood that I propose to retain the automatic system of operation always without converting the system to the direct-air system, so that the brakes shall always be applied by first admitting the train-pipe air into the auxiliary reservoir while the communication between reservoir and brake-cylinder is closed and then admitting the compressed air from the auxiliary reservoir to cylinder through a reduction of the train-pipe pressure.

I have preferred to illustrate and describe my improvements in connection with and as applicable to either of two well-known types of quick-acting triple valve, and I do not deem it necessary to describe them here, as such description and their differences are fully set forth in my prior United States patent, issued to me June 24, 1902.

Referring to the drawings, Figure 1 is a vertical section of a quick-acting triple valve and its casing, showing in the same section a representation of additional mechanism for accomplishing the additional results above referred to. Fig. 2 is a similar section of a slightly different type of quick-acting triple valve and its casing, showing a modified form of my improvements, the principal part of the new mechanism being placed in a separate casing which is to be fastened appropriately to the triple-valve casing. Figs. 3 to 7, both inclusive, illustrate modifications and improvements in certain details which will be fully explained hereinbelow. Fig. 3 is a plan view of the main valve 5 upon its seat, showing also a modification from the corresponding parts of Fig. 2. Fig. 4 is a section of Fig. 3 on the line Y Y looking in the direction of the arrows. Fig. 5 is a section of a part of the triple-valve casing of Fig. 2, but showing a modification thereof. Fig. 6 is a plan of the main valve 5 of Fig. 5 upon its seat. Fig. 7 is a view of the face of the valve 105 of Fig. 5. Fig. 8 is a vertical section of a valve similar to Fig. 2, showing a modification. Fig. 9 is a vertical section of a device similar to Fig. 1, showing a modification. Fig. 10 is a top or plan view of the main valve and its seat of Fig. 8. Fig. 11 is a top or plan view of the valve 50 and its seat of Fig. 9.

I refer first to Fig. 1, which includes a main casing 1 and a smaller casing or cap 2. The triple valve proper embraces a piston 4, a slide-valve 5, a slide-valve spring 6, and a graduating-valve 7, controlling the graduating-port 25 in the slide-valve, these being the usual parts of an ordinary triple valve. The piston 4 moves in a chamber 8, which is provided with a bushing 9. What is commonly known as a "charging" groove or passage 10 is made in the bushing 9 at the upper left-hand corner of chamber 8, so as to be opened by the piston 4 in its normal or release position, (shown in Fig. 1,) through which air may be charged into the auxiliary reservoir. Another port or series of ports 11 opens through the bushing 9 into a cavity 12, which, by preference, is cored in the casing around said bushing, the purpose of said port or ports being to recharge the auxiliary reservoir while brakes are applied. From the cavity 12 a passage 13 leads to the auxiliary reservoir past the check-valve 14. The slide-valve 5 moves within a chamber 16, which has a bush 17. Through said bushing, on its under side, is the port 19, leading to the brake-cylinder through passage 26, the port 20, leading to the atmosphere, and the port 21, which normally connects the triple-valve chamber 16 with the cavity 22. The slide-valve 5 has on its face a main cavity 24, normally holding the brake-cylinder at exhaust through ports 26, 19, and 20. The ports 19, 20, and 21 and the cavity 24 are shown in dotted lines in Fig. 3. The port or passage 19 is usually called the "service" port or passage, and the port 20 is usually called the "exhaust-port." The cap or casing 2 incloses a chamber 80, in which operates a piston 81, whose stem moves nearly air-tight through a bushing 82 and which is held normally at the right-hand end of its chamber by the spring 84. The chamber 80 is closed by a cap 83. Air from the train-pipe entering the valve-casing through the nozzle 60 goes by the passage 61 into the chamber 8 and also by the passage 85 against the right-hand side of piston 81. Attached to the upper side of the casing 1 is a casing 41, which, with its inclosed mechanism, I shall call, for purposes of convenience, the "recharge-release" attachment. In the casing 41 is a diaphragm 30, backed up by a piston or disk 36, against which bears a spring 37, these parts being inclosed in a box 38. The force or tension of the spring 37 is regulated by an adjusting-nut 39, which in turn may be covered and locked by a cap-nut 40. The right-hand side of the diaphragm 30 is normally open to the atmosphere, while its left-hand side is normally exposed to air under pressure in the chamber 34, admitted thereto through the passage 35, (shown partly in dotted lines,) which is preferably normally in open communication with the train-pipe. A coupling-rod 54 connects the disk 36 to a valve 31, which operates upon a valve-seat 55 to control communication between two passages 48 and 90. A small diaphragm 52 serves like a frictionless stuffing-box to prevent passage of air between passages or chambers 34 and 90. The diaphragm 52 is held in place in a box or holder 53 by a nut 57. A pin 56, moving in a slot in the holder 53, prevents rotation of the coupling 54 while the disk 36 is being screwed upon or off the coupling. The casing 41 also embraces another chamber, which incloses a bushing 44, within which operates a piston 43 to control two valves 32 and 45.

The valve 45 is held normally in closed position by a spring 46, and the check-valve 32 is held normally open, but is moved to its seat in the cap 49 by the light spring 33 as quickly as piston 43 moves out of the way.

The operation of the mechanism will now be readily understood. Air from the train-pipe entering by the nozzle 60, to which the branch train-pipe is attached, goes through the passage 61 to the chamber 8 and thence by the charging-groove 10 into the auxiliary reservoir. It likewise goes from the chamber 8 through the ports 11 and cavity 12, past the valve 14, through passage 13 to the reservoir, supposing this passage to be open. The air will also flow through the passage 85 to the right-hand side of piston 81 and through the passage 35 into chamber 34 against the diaphragm 30. As the air enters the chamber 16 it flows through ports and passages 21, 22, 85 and 92 into chamber 91 and thence by passage 90 to the valve 31. At the same time it also flows through the passage 94 past the valve 32 to the right and thence through the passage 93 (shown partly in dotted lines) into the chamber 80 at the left of piston 81, thus balancing said piston. The chamber of the piston 43 at the right of the piston will be filled with compressed air by leakage past the piston and also by air admitted through the passage 48 and the ports 47. The position of all parts of the mechanism in Fig. 1 is that in which all parts of the brake system are charged with compressed air at the normal running pressure, which is usually about seventy pounds per square inch. Under these circumstances the spring 37 is preferably adjusted to balance an air-pressure on the left-hand side of diaphragm 30 of about sixty-seven or sixty-eight pounds per square inch. Supposing the parts of the brake system are charged with air at about seventy pounds per square inch, to set the brakes in a service application the train-pipe pressure is gradually reduced about six to eight pounds, this being the usual amount of reduction required for a service application. This reduction will be felt both in the chamber 8 at the right-hand side of piston 4 and also in chamber 34 at the left-hand side of diaphragm 30, the air in said chamber flowing out through the passage 35. This reduction of pressure in chamber 34 permits the spring 37 to move the disk 36 and valve 31 to the left and seat said valve firmly, thus closing all communication between passages 48 and 90. The train-pipe pressure in chamber 8 being reduced, the higher reservoir-pressure on the opposite side of piston 4 moves it to the right, first opening the valve 7 and then drawing the valve 5 to the position in which port 25 registers with port 19, which permits air from the reservoir to flow to the brake-cylinder. In this movement the piston 4 stands at the right-hand side of the ports 11. The same movement of the valve 5 causes the cavity 24 to connect ports 20 and 21, supposing that these ports are in line, thus exhausting the air from passages and cavities 90, 91, 92, and 22. The flow of the reservoir-air to the brake-cylinder continues until the pressure at the left of the piston 4 falls slightly below the train-pipe pressure at the right of the piston, when said piston moves to the left, closing the graduating-valve 7, and by the same movement passes across or to the left of the recharging-ports 11. If it is desired to set the brakes with greater force, a further moderate reduction is made in the train-pipe pressure, which moves the piston 4 to the right across the ports 11, opening valve 7 and admitting more pressure from reservoir to brake-cylinder. These operations may be repeated as desired. Neither of the pistons 81 or 43 is affected in any way by these operations. When it is desired to recharge the auxiliary reservoir, compressed air is gradually admitted to the train-pipe, which flows through chamber 8 and ports 11 and passage 13 to the reservoir, as already explained, the triple valve remaining meanwhile in brake-setting position, with ports 25 and 19 registering. After recharging the reservoir to the desired extent the train-pipe pressure may be again reduced, thus opening the valve 7 and admitting more reservoir-pressure to the cylinder. In all reductions of train-pipe pressure the valve 14 prevents the backward flow of air from reservoir to train-pipe. It is evident that the brakes may be set and the auxiliary reservoir recharged as often as desired, keeping the brakes continuously set all the while, care being taken not to recharge the system with pressure high enough to move the diaphragm 30 against the spring 37 and open the valve 31. When it is desired to release the brakes, remembering that the triple valve is at the right, so that cavity 24 connects ports 20 and 21, the pressure in the system is increased until the diaphragm 30 and its connected parts are moved to the right, so as to open the valve 31, as shown in Fig. 1. The opening of the valve 31 vents the air from the chamber of the piston 43 at the right-hand side of said piston through the ports and passages 47, 48, 90, 91, 92, 22, 21, 24, and 20, until said piston is sufficiently unbalanced to begin its movements to the right and open the valve 45 against the spring 46. Any remaining pressure in the piston-chamber thereupon escapes instantly past said valve 45, causing the piston 43 to perform an instantaneous movement to the right-hand end of its chamber until it stands between the two ports 47. Meanwhile the spring 33 closes the valve 32. The pressure in the chamber 80 at the left of piston 81 is thereupon exhausted through the passages and ports 93, thence around the piston 43 by going upward through one of the ports 47, thence to the right and downward through the other of said ports, then past the valve 45 and through 90 91 92, &c. This reduction of pressure in the chamber 80 permits the pressure at the right of piston 81 to move it to the left against the spring 84 until the triple valve is moved to release position, which is shown in Fig. 1. The air-pressure in chamber 16 then flows through passages 21, 22, 92, 91, and 90 past the valve 45 against the piston 43, rebalancing said piston and permitting the spring 46 to move it to the left, seating valve 45 and opening valve 32, whereupon the air-pressure flows through passages 94 and 93 into chamber 80, rebalancing piston 81 and permitting the spring 84 to move it back to its normal position. The entire mechanism will thereupon be recharged and all the parts will be returned to their normal positions, as shown in Fig. 1.

Going now to Fig. 2, its operation will be readily understood, as well as its differences in construction from Fig. 1. I have already indicated that Fig. 2 represents a type of quick-acting triple valve in which the emergency mechanism is made dependent upon the prior movement of the triple valve, which therefore has one movement or traverse for a service application and a second or further traverse for emergency application. It will readily be recognized that the cap 2, the stem 63, and the spring 64 are the usual parts of such a type of triple valve and also that the port 23 is the usual port through which pressure is admitted from the reservoir into the chamber below in order to cause the emergency operation. The proper position of port 23 is seen in Fig. 6. All the parts of the attachment, including the casing 41 and its inclosed mechanisms, are the same in operation and construction as the corresponding parts of Fig. 1. The passage 13 leads to the auxiliary reservoir and likewise by a branch thereof into chamber 16. The chamber 80, piston 81, and spring 84 serve the same general purpose as the corresponding parts of Fig. 1, excepting that they are located on the opposite side of the triple valve. A cap 87 closes the chamber 80. A stem 86, which is attached to or forms an extension of the stem of the triple piston 4, slides easily through the piston 81, so as to operate practically air-tight, but without friction. The system is charged in the usual way through the passage 61, which is in communication with the train-pipe. The lower section of casing containing the train-pipe nozzle, which is usually attached to the under side of casing 1, is omitted in Fig. 2, since it is wholly unnecessary in order to understand my improvements. It will be observed that the position of the parts in Fig. 2 assumes that the system has already been charged to the normal pressure and that the train-pipe pressure has been sufficiently reduced to move the triple valve into position for setting the brakes and that the pressure in the system is now being increased either for the purpose of recharging the reservoir or for the purpose of release. The positions of the diaphragms 30 and 52 and the valve 31 are the opposite of those shown in Fig. 1, the valve 31 being closed instead of open. It is evident that the pressure may be reduced and the brakes applied, or it may be increased and the reservoir recharged as often as desired, care being taken not to increase the pressure in the chamber 34 sufficiently to open the valve 31. When it is desired to release, supposing that cavity 24 connects ports 21 and 20, as already explained with regard to Fig. 1, the pressure in the chamber 34 is increased until the diaphragm 30 is moved to the right against the spring 37 and the valve 31 opened. This vents the air from the chamber at the right of piston 43, through ports 47 and 48, into 90 and 91, which are at exhaust, causing the piston 43 to move to the right, opening valve 45 and closing valve 32. Air from the chamber 80 thereupon escapes through passage 93 around the piston 43, past the valve 45, &c., as already explained with regard to Fig. 1. This unbalancing of piston 81, which, it will be observed, has the reservoir-pressure against its right-hand side, moves said piston to the left-hand end of its chamber and draws the triple valve to release position, in which the piston 4 opens the charging-port 10. As the valve 5 opens the port to the triple-valve chamber the air flows through the ports and passages 21, 22, 92, 91, and 90, past the valve 45, to rebalance the piston 43, allowing the spring 46 to shift to the left, seat the valve 45, and open valve 32, whereupon the air-pressure flows through 94 and 93 to rebalance piston 81 and permit the spring 84 to return it to its normal position. (Shown in Fig. 2.) All parts of the system will thereupon be charged to the full normal pressure and the operative mechanism will be in position for another operation.

In Fig. 1 it has been assumed that the piston 4 after moving to brake-setting position closed the graduating-valve 7 and by the same movement passed across and opened the recharging-ports 11 to the train-pipe. In Fig. 2 a slightly-different arrangement is seen, in which the triple valve performs a little further movement to the right in order to cause the port 25 to register with the port 19. When the piston moves to the left and closes the graduating-valve, it does not open the ports 11 by the same movement; but before the recharging-ports are opened the entire triple valve must move to the left far enough to take the port 25 out of register with port 19, but without permitting the cavity 24 to connect ports 19 and 20. With this latter arrangement no air admitted through the recharging-ports can possibly get to the brake-cylinder until the train-pipe pressure is again reduced and the triple valve again moved toward the right.

It will be noticed in both Figs. 1 and 2 that when the triple valve is in release position both the ordinary charging-port 10 and the recharging-ports 11 and passage 13 are open to the train-pipe, so that the train-pipe air admitted into chamber 8 will go to the reservoir much more rapidly than it would go if only the port 10 were open. If it should be deemed desirable to close the recharging port or passage as soon as the triple valve moves to release position, this result can be effected by a modification of the main valve 5, such as shown in Figs. 3 and 4. The ports 19 20 21 and the cavity 24 serve the same purpose, essentially, as already explained with reference to Fig. 2. Instead of the graduating-valve 7 of Fig. 2 a slide-valve 105 (seen in Fig. 4) performs the graduating function. The valve 5 in Fig. 3 has an extension at its right-hand end, with a cavity 67 (seen in dotted lines) on its under face. It will be seen in Figs. 1 and 2 that the passage 13 leads directly to the auxiliary reservoir. In Fig. 3, however, the passage 13, through which the air flows while recharging the reservoir, leads through the casing 1 to the bush 17, then passes around and underneath said bushing and through a port 65, Fig. 4, in the same. Another port 66 likewise passes through the bush 17 and communicates with the passage 113, leading to the reservoir. This latter number is employed in Figs. 3, 4, and 6 to indicate that the passage 113 is really a continuation of passage 13. It is understood that in Fig. 4 the valve 5 of Fig. 3 is moved far enough to the right so that the cavity 67 registers with the ports 65 and 66. When the triple valve is in the brake-setting position, the valves 5 and 105 are in position seen in Fig. 4. When it is desired to recharge the reservoir, air is charged into the train-pipe, as already explained, and passes through ports 11 and 12 to 13 and thence through the ports 65, 67, 66, and 113, as seen in Fig. 4, to the auxiliary reservoir. As quickly as the brakes are released by the triple valve moving to release position the cavity 67 on the face of the valve 5 passes to the left of ports 65 and 66, so that those ports are no longer in communication; but they are effectually closed, as seen in Fig. 3. Air can therefore no longer flow through the recharging-passage 13 so long as the triple valve remains in release position.

In the figures thus far discussed the recharging-ports 11 are controlled by the piston 4, so that the recharging-passage is only open when the piston moves to the left of said ports. In Figs. 5, 6, and 7 a modification is shown in which the ports 11 in the bush 9 are abandoned and the recharging-passage is always open to the train-pipe by extending the cavity 12, as seen in Fig. 5. In this arrangement of parts the passages and ports 13, 65, 66, and 113 are exactly the same as seen in Figs. 3 and 4. The valve 5 has the same extension as seen in Fig. 3; but instead of the cavity 67 on its face there are two ports 68 and 69, extending through said valve. These are illustrated in Figs. 5 and 6, which show the parts in position for setting the brakes and for recharging the reservoir, in which case ports 68 and 69 in the valve 5 are in register with ports 65 and 66, respectively, in the bush 17. The valve 105, which serves the purpose also of a graduating-valve, likewise has a cross-cavity 114 on its face, (seen in Figs. 5 and 7,) which, according to its position, opens or closes communication between the ports 68 and 69. Fig. 5 shows the triple valve in position for setting the brakes and recharging the reservoir. Air being admitted to the train-pipe flows through passages 12 and 13 and thence around the bush 17 and up through the ports 65 in the bush and 68 in the valve 5, thence by the cavity 114 and down through the ports 69 and 66 (seen in Fig. 6) into the passage 113, which leads to the reservoir, as in Fig. 3. When the brakes are to be further set, the train-pipe pressure is reduced, which moves the piston 4 to the right and draws the valve 105 to the position to open the port 25, so that reservoir-air can flow to the brake-cylinder, and at the same time moves the cavity 114 to the right of ports 68 and 69, so that those ports are no longer in communication. The cavity 114 in the valve 105 is so arranged with reference to the ports 68 and 69 and the movement of the valve over the port 25 that after the port 25 has been opened the valve 105 in moving to the left will close port 25 just prior to bringing the cavity 114 over to ports 68 and 69. No air can therefore flow from train-pipe to reservoir until after the passage from reservoir to brake-cylinder is closed. When the triple valve in Figs. 5 and 6 moves to release position, it is apparent that the ports 68 and 69 in the valve 5 will pass to the left of ports 65 and 66 in the bushing 17, so that the latter ports will be effectually closed by the end of the slide-valve, just as they are in Fig. 3.

In Figs. 3 to 7 a further modification is shown with regard to controlling the ports 21 22 92, &c. Instead of the cavity 24 on the face of valve 5 placing ports 20 and 21 in communication a supplemental cavity 107 is employed to control port 21, which is seen in Figs. 3 and 6. Two ports 108 and 109 lead from the top of the valve 5 into cavities 24 and 107, respectively. A cavity 110 on the face of valve 105 controls these two ports. The parts are so arranged that when the triple valve moves to brake-setting position and the valve 105 opens the port 25 to the brake-cylinder the ports 108 and 109, and therefore ports 20 and 21, are held out of communication. The cavity 107 stands over the port 21; but there will be no exhaust of air through the port 12 and the passages connected therewith in this position of the valve 105. When the piston 4 assumes the position for recharging the reservoir, (seen in Fig. 5,) the cavity 110 connects ports 108 and 109, and therefore ports 20 and 21, thus exhausting the cavities and passages 21 22 92 91, &c., and placing the mechanism in condition for effecting the release of the brakes when the train-pipe pressure is increased sufficiently to actuate the releasing mechanism in the manner already hereinabove fully explained. Port 21 is not open to chamber 16 in this construction when the triple valve moves to release position. This does not interfere with the subsequent operation of the system, because the flow of air past the piston 43 through the ports 47 is sufficient to rebalance the piston 43 very quickly, so as to permit the spring 46 to return said piston to its normal position, seating valve 45 and opening valve 32.

Fig. 8 is a vertical section of substantially the same mechanism illustrated in Fig. 2 with certain modifications. I have omitted from the mechanism the piston 43 and the two valves operated thereby merely to show that said piston and valves are not absolutely necessary. The employment of the valve 105 upon the main valve 5 gives the same general arrangements as in Figs. 5, 6, and 7. When the system is charged with compressed air, it leaks past the piston 81 into chamber 80 and also goes through the passage 90, past the valve 31, and thence by passage 48 into chamber 80. With the triple valve in the position shown, to release brakes the air is charged into the system sufficiently to move diaphragm 30 to the right and open valve 31, whereupon the ports and passages 90 91 22, &c., being at exhaust the air at the left-hand side of piston 81 is released, so that the pressure on the right of the piston moves it to the left-hand end of its chamber and draws the triple valve to release position, as explained in connection with Fig. 2. In this figure also there are two cavities 24 and 107 in the main valve 5, the former resting over the exhaust-port 20 and the latter over the port 21, as seen in Fig. 10. Two ports 108 and 109 lead from the top of the valve to these two cavities on the valve-face, and a cross-cavity 110 in valve 105 (seen in Fig. 8) connects said ports, and therefore the ports 20 and 21, when the piston 4 occupies the position for recharging the reservoir, as seen in Fig. 8, but keeps said ports out of communication while air is being admitted from auxiliary reservoir to the brake-cylinder.

Fig. 9 shows another modification employing, essentially, the triple-valve construction of Fig. 1. The graduating-valve 7 of Fig. 1 is replaced by a graduating-slide 105. For the same reason as in Fig. 8 the piston 43 and the valves operated thereby are omitted from the structure. Instead of the port 21 being controlled by the main valve 5 a small valve 50 is arranged to operate in a chamber in the casing 2 to control the ports 21, 51, and 11. The said valve is held between disks on a stem 59, which is attached to the piston 4 by a suitable pin 60 and moves with the piston 4 to alternately open and close port 21 to an exhaust-port 51, according as the piston occupies the position for setting or releasing brakes. Likewise the recharging-port 11 instead of being controlled by the piston 4 directly is placed in the bush of the valve 50. When the pressure is reduced for setting brakes, the piston 4 moves to the right, opening the port 25 in the valve 5 and then drawing the valve 5, so that port 25 registers with port 19, and by the same movement causes the valve 50 to cover the port 11 in the seat of valve 50 and connect ports 21 and 51. As the reservoir-pressure declines in expanding to the brake-cylinder below the train-pipe pressure the piston 4 moves to the left, closes the port 25, and opens recharging-port 11. The ports should be preferably arranged so that port 25 is closed just prior to the opening of port 11. In this position of the triple valve, therefore, air may be charged into the train-pipe slowly, whence it flows through the port 11, thence by cavity 12 past the valve 14 and through the passage 13 to the reservoir. This permits the recharging of the reservoir as often as desired and keeping the brakes meanwhile continuously applied. To release the brakes, remembering that the triple valve is in such position that the valve 50 is connecting the ports 21 and 51, so that the passage 90 is at exhaust, air is charged into the train-pipe until the normal pressure is reached and going through the passage 35 to the diaphragm 30 and through the passage 85 to the right of the piston 81 said diaphragm is moved to the right and the valve 31 opened. This vents the air from the chamber 80 at the left of piston 81, causing said piston to move to the left and by the impact of its stem against the stem 59 forces the triple valve to release position. The apparatus is therefore in the condition shown in Fig. 9, in which air goes through the port 21, the passages 90 and 48 to the left side of piston 81 permitting the spring 84 to return the piston to the position shown. The stuffing-box 82 may also be loosely packed, so as to permit sufficient air to leak past the stem of piston 81 to refill the chamber 80. The arrangement of the valve 50 and the ports 11, 21, and 51 is seen in Fig. 11.

In Figs. 3 to 7, inclusive, the means for moving the triple valve to release position with certainty are not shown; but it is evident that I may employ either devices, such as illustrated in the other figures, and unbalance a supplemental piston, such as 81, or such means as illustrated in my United States Patent No. 702,926, issued to me June 24, 1902, in which the triple piston itself is unbalanced.

I claim—

1. In a fluid-pressure brake mechanism, the combination, with a triple valve having connections leading to a train-pipe, an auxiliary reservoir and a brake-cylinder, respectively, of a supplemental piston for forcing the triple valve into its normal or release position and a second valve device actuated by an increase of fluid-pressure, independently of the movement of the triple-valve piston, for varying the pressures on said supplemental piston, whereby the same may be actuated to force the triple valve into its normal or release position.

2. In a fluid-pressure brake mechanism, the combination, with a triple valve having connections leading to a train-pipe, an auxiliary reservoir and a brake-cylinder, respectively, of a supplemental piston normally exposed to fluid under pressure, for effecting the movement of the triple valve into the release position, a passage for releasing pressure from one side of said piston and a valve device actuated by an increase of pressure, independently of the movement of the triple-valve piston, for controlling said passage.

3. In a fluid-pressure brake mechanism, the combination, with a triple valve, of a recharging-passage for admitting pressure from train-pipe to reservoir while the triple valve is in brake-setting position, a supplemental piston for forcing the triple valve into its normal or release position and a secondary valve device actuated by an increase of fluid-pressure, independently of the movement of the triple-valve piston, for varying the pressures on said supplemental piston, whereby the same may be actuated to force the triple valve into its normal or release position.

4. In a fluid-pressure brake mechanism, the combination, with a triple valve, of a recharging-passage for admitting pressure from train-pipe to reservoir while the triple valve is in brake-setting position, a supplemental piston normally exposed to fluid under pressure, for effecting the movement of the triple valve into the release position, a passage for releasing pressure from one side of said piston and a valve device actuated by an increase of pressure, independently of the movement of the triple-valve piston, for controlling said passage.

5. In a fluid-pressure brake mechanism, the combination, with a triple-valve device, of a recharging-passage for admitting pressure from train-pipe to reservoir while the triple valve occupies the brake-setting position, a valve for controlling said recharging-passage and closing the same while brakes are off, and a supplemental valve device actuated by a variation of pressure, independently of the movement of the triple-valve piston, for causing the triple valve to move into release position.

6. In a fluid-pressure brake mechanism, the combination, with a triple valve, of a supplemental valve, a valve device actuated by a variation of fluid-pressure, independently of the movement of the triple-valve piston, for controlling by its operation the ultimate movement of the triple valve to release position, and a passage controlled both by said supplemental valve and by said valve device.

7. In a fluid-pressure brake mechanism, the combination, with a triple valve, of a recharging-passage for admitting pressure from train-pipe to reservoir while the triple valve is in the brake-setting position, and ports in the main valve and the graduating-valve of the triple valve forming parts of said recharging-passage, whereby said passage is controlled both by the main valve and the graduating-valve.

8. In a fluid-pressure brake mechanism, the combination, with a triple-valve device, of a service-passage for admitting pressure from reservoir to brake-cylinder, a recharging-passage for admitting pressure from train-pipe to reservoir while the triple valve is in the brake-setting position and a single valve operated by the triple-valve piston for controlling both of said passages, so that one shall be open while the other is closed, and vice versa.

MURRAY CORRINGTON.

Witnesses:
    Mauce. Spillane,
    Charles W. Strong.